US012358768B2

(12) United States Patent
Walther

(10) Patent No.: US 12,358,768 B2
(45) Date of Patent: Jul. 15, 2025

(54) LOAD-COMPENSATING DEVICE FOR A LIFTING APPLICATION WITH AN OBJECT TO BE LIFTED OR LOWERED

(71) Applicant: Siemens Aktiengesellschaft, Munich (DE)

(72) Inventor: Steven Walther, Saalfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/848,980

(22) PCT Filed: Feb. 22, 2023

(86) PCT No.: PCT/EP2023/054424

§ 371 (c)(1),
(2) Date: Sep. 20, 2024

(87) PCT Pub. No.: WO2023/180002

PCT Pub. Date: Sep. 28, 2023

(65) Prior Publication Data

US 2025/0109001 A1 Apr. 3, 2025

(30) Foreign Application Priority Data

Mar. 21, 2022 (EP) .................................... 22163264

(51) Int. Cl.
*B66F 7/06* (2006.01)

(52) U.S. Cl.
CPC ............ *B66F 7/065* (2013.01); *B66F 7/0633* (2013.01)

(58) Field of Classification Search
CPC ....... B66F 7/065; B66F 7/0633; B66F 7/0658
See application file for complete search history.

(56) References Cited

U.S. PATENT DOCUMENTS 3,556,481 A * 1/1971 Mueller .................... B66F 7/08 254/8 B
4,764,075 A * 8/1988 Cox ........................ B66F 7/065 211/59.3

(Continued)

FOREIGN PATENT DOCUMENTS

CN 206970114 2/2018
CN 207108354 3/2018

(Continued)

OTHER PUBLICATIONS

PCT International Search Report and Written Opinion dated Apr. 3, 2023 based on PCT/EP2023/054424 filed Feb. 22, 2023.

*Primary Examiner* — Seahee Hong
(74) *Attorney, Agent, or Firm* — Cozen O'Connor

(57) ABSTRACT

A load-compensating device for a lifting application with an object to be lifted or lowered includes a movable platform, wherein the platform carries the object and, for purposes of load compensation, the platform is supported by at least one spring element that acts on a spreading unit which, in order to achieve spreading, transfers a spring force of the spring element into a scissors arrangement, where, by virtue of the scissors arrangement, the spring force results in a lifting force that produces a lifting action on the platform, and where a substantially constant lifting force is provided over a substantial lifting distance of the platform by the lifting geometry formed via the spreading unit and the scissors arrangement.

6 Claims, 9 Drawing Sheets

(56) References Cited

U.S. PATENT DOCUMENTS

| | | | | | |
|---|---|---|---|---|---|
| 5,222,709 | A * | 6/1993 | Culley, Jr | B60N 2/522 | 267/74 |
| 5,632,209 | A * | 5/1997 | Sakakibara | B66F 7/065 | 248/588 |
| 5,833,198 | A * | 11/1998 | Graetz | B66F 7/065 | 248/370 |
| 5,957,426 | A * | 9/1999 | Brodersen | B60N 2/505 | 248/564 |
| 7,246,784 | B1 * | 7/2007 | Lopez | B66F 7/065 | 248/188.7 |
| 7,383,923 | B2 * | 6/2008 | Patten | B66F 7/065 | 182/69.5 |
| 9,310,753 | B2 * | 4/2016 | Moore | B66F 7/08 | |
| 2011/0240409 | A1 | 10/2011 | Bacon | | |

FOREIGN PATENT DOCUMENTS

| | | | |
|---|---|---|---|
| CN | 211310736 | | 8/2020 |
| DE | 3639216 | | 5/1988 |
| DE | 102012020264 | A1 | 4/2014 |
| EP | 2019076 | | 1/2009 |
| EP | 3476792 | | 5/2019 |
| EP | 3922592 | | 12/2021 |
| JP | H07267594 | | 10/1995 |
| KR | 20200003464 | | 1/2020 |

* cited by examiner lower position upper position

LOAD-COMPENSATING DEVICE FOR A LIFTING APPLICATION WITH AN OBJECT TO BE LIFTED OR LOWERED

CROSS-REFERENCE TO RELATED APPLICATIONS

This is a U.S. national stage of application No. PCT/EP2023/054424 filed 22 Feb. 2023. Priority is claimed on European Application No. 22163264.9 filed 21 Mar. 2022, the content of which is incorporated herein by reference in its entirety.

BACKGROUND OF THE INVENTION

1. Field of the Invention

The invention relates to a mechanically acting load-compensating device for increasing the power and efficiency of vertical lifting applications, where it should be possible to integrate this flexibly into existing or newly designed lifting systems, thereby enabling the load on the drivetrain or the entire lifting mechanism to be relieved and hence the efficiency of the overall system to be significantly increased. By virtue of this load relief, it is possible not only to reduce the drive power and energy consumption but also to make the entire lifting device correspondingly smaller and lighter, to increase load bearing capacity and thus to increase the power density of the overall system.

2. Description of the Related Art

U.S. Pub. No. 2011/0240409 A1—Bacon "SCISSOR LIFT ASSEMBLY" discloses a lift table comprising a scissor mechanism in which a motor-driven spindle is arranged between two legs of a scissor pair, where the lift table has a low overall height in the lowered state.

U.S. Pat. No. 5,833,198 A—Graetz "MECHANICALLY OPERATED LIFT TABLE" likewise discloses a lift table with a scissor mechanism, in which a spring element is arranged between the legs of a scissor pair, where the spring characteristic is selected such that, when subjected to a load assembly, the lift table is lowered substantially by the overall height of the load assembly, and a substantially load-independent total height of the loaded lift table is obtained.

JP H07 267594 A—Mizouchi Seiji "MOTOR-DRIVEN TABLE LIFTER" discloses a scissor lift table upon which a compression spring is provided to support the drive via a drive spindle.

Hitherto, in the case of lifting devices of the kind described in DE 10 2012 020 264 B4, for example, compression spring elements have been placed between the bottom frame and top frame or lifting platform so as to achieve relief of the load on the lifting mechanism and on the drivetrain. This direct attachment entails a number of disadvantages. Thus, for example, massive guide elements and complex spring mountings are required to prevent buckling of the compression spring elements. The reason is that, if side forces act on the spring elements, then this would considerably reduce the service life. To ensure that there is a significant relief of the load on the lifting mechanism, even in the upper position, a high spring prestress must be applied to the spring elements on account of the shallow spring characteristic. During maintenance work on the lifting system, however, the energy stored in the spring prestress must be reliably separated or decoupled or isolated from the lifting system, leading to complex maintenance concepts and possibly additional devices.

Moreover, in the case of direct incorporation of the spring elements, it is disadvantageously impossible to produce a constant force profile over the entire stroke since the spring force increases in accordance with the spring characteristic during contraction.

Although solutions with compensating weights of the kind known from elevators for people, for example, provide constant support over the entire lifting height, it is generally not possible to use them for mobile applications and they have high moving masses and are therefore unsuitable for many industrial applications.

SUMMARY OF THE INVENTION

In view of the foregoing, it is therefore an object of the present invention to provide a load-compensating device for a lifting application (use for lifting, lifting mechanism, lifting and lowering conveying device, lift table or the like) that offers a supporting force that is as linear as possible and, at the same time, as constant as possible over a lifting height. At the same time, the required solution should be light and capable of being maintained in a risk-free manner after the adoption of a maintenance position.

The solution of this object comprises the interaction of mechanically acting spring elements with a scissor mechanism which is actuated by a spreading unit and which, in turn, has a supporting effect on a load-receiving means, referred to below as a "platform". The solution in accordance with the invention thus exhibits a combination of mechanically acting spring elements with a scissor mechanism which is actuated by a spreading unit and which produces a uniform lifting/force profile between two platforms that can be moved vertically relative to one another. This load-compensating device is characterized by compact dimensions, flexible handling and high performance in combination with low manufacturing, assembly and maintenance effort.

These and other objects and advantage are achieved in accordance with the invention by a load-compensating device for a lifting application with an object to be lifted or lowered, comprising a movable platform, where the platform carries the object, and where, for purposes of load compensation, the platform is supported by at least one spring element. Here, the spring element acts on a spreading unit which, in order to achieve spreading, transfers a spring force of the spring element into a scissors arrangement, where, by virtue of the scissors arrangement, the spring force acts as a resultant lifting force, exerting a lifting action on the platform, and where a substantially constant lifting force is provided over a substantial lifting distance of the platform by the lifting geometry formed via the spreading unit and the scissors arrangement. The size and the linearity or constancy of the supporting force (lifting force) can be set in a simple manner by adapting the geometry, particularly the length/size of the structural elements of the spreading unit and the length of the legs of the scissors arrangement. The load-compensating device is also characterized by compact dimensions, flexible handling and high performance in combination with low manufacturing, assembly and maintenance effort.

In accordance with the invention, the spring element is configured as at least two tension springs acting in parallel and is prestressed with a spring prestress at a level such that the spring element is formed as a block in an upper lifting position, thus ensuring that there is no need to take any additional measures to disconnect the force or energy of the energy accumulator in the case of maintenance.

It is advantageous if the lifting geometry is configured such that a spring force that changes in the course of lifting is substantially compensated by a lever effect that changes in the course of lifting. This results in substantially constant support, i.e., optimized load compensation, even in the case of steep spring characteristics, and, in many cases, renders obsolete a high spring prestress for the use of the spring in a working range that is as linear as possible.

In a simple embodiment, the spreading unit comprises thrust rods, where the thrust rods are each articulated between the spring accumulator and a scissor arm of the scissors arrangement.

It is advantageous if the spreading unit acts on a cam geometry, where the cam geometry predetermines the profile of the lever action of the spreading unit on the scissors arrangement. It is thereby possible to compensate for non-linear profiles of the spring force; in addition, it is thereby possible to create a variable supporting force in the course of lifting, which is desired in some applications, via an appropriate configuration of the cam geometry. In an embodiment of the cam geometry that is constructed simply and compactly, the cam geometry is formed by at least one curved surface of a scissor arm of the scissors arrangement, where the spring force of the spreading unit acts on the curved surface via a slider or a roller structure.

In another embodiment, the spreading unit has a spreading wedge geometry on at least one side. A particularly compact configuration is thereby possible. In addition, it is thereby possible to convert even shallow spring characteristics effectively into constant load compensation or a constant supporting force. Depending on the use, it may be worthwhile to provide a spreading wedge arrangement at one end of the tension spring and thrust rods at another end of the spring. A combination of a cam geometry with thrust rods or a spreading wedge arrangement is also possible.

Given appropriate dimensioning of the load-compensating device, this can also exert a vertical guidance function; the supported lifting mechanism can then be made simpler in terms of configuration and can be restricted to the lifting function.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the load-compensating device according to the invention and advantageous embodiments are described below with reference to the drawings, in which.

DETAILED DESCRIPTION OF THE EXEMPLARY EMBODIMENTS

Figure 1:
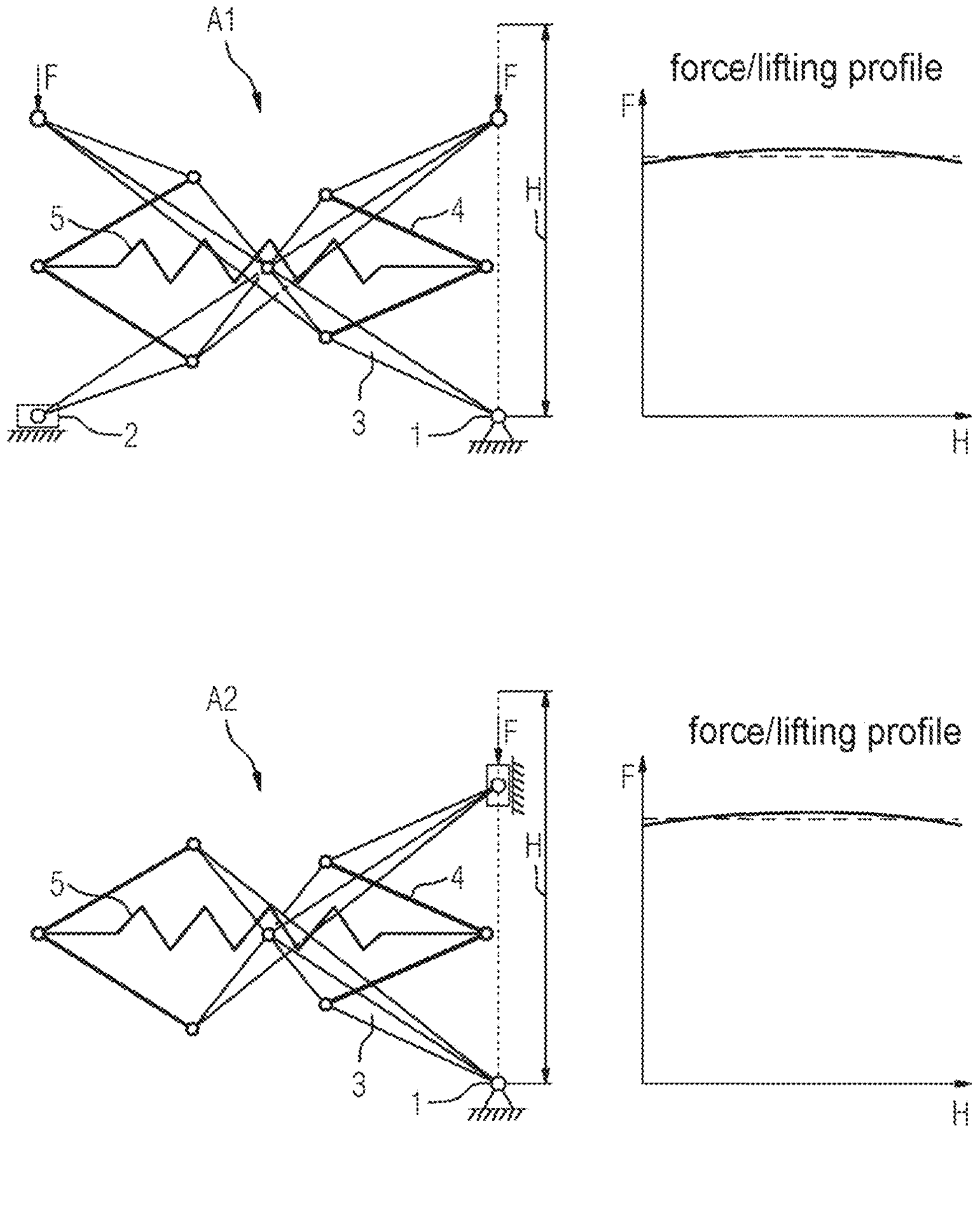
FIG. 1 shows a schematic illustration of two embodiments A1, A2 of the mechanism kinematics of the load-compensating device with thrust rods as a spreading device in accordance with the invention.

On the left, in schematic form, FIG. 1 shows two embodiments A1, A2 of the mechanism kinematics of the device in accordance with the invention with mechanism elements, and, on the right, it shows the respectively associated force/lifting profile. The figure illustrates two centrally connected scissor arms (3), which are pivotable relative to one another and to each of which two likewise pivotably mounted thrust rods (4) are attached, where the opposite end of the thrust rods is coaxially mounted. A spring energy accumulator (5), which is likewise coaxially mounted and that acts in tension, is attached thereto. For the sake of clarity, the movable platform (10) via which the force associated with the weight of the object to be moved is introduced into the arrangement is not shown in the schematic illustrations in FIGS. 1-5.

The spreading apart of the scissor arms (3) is achieved via the thrust rods (4) via the tensile force emanating from the energy accumulator (spring assembly). Consequently, the compensating force (F) acts on the ends of the scissor arms.

If it is possible, based on the application, to dispense with a rectilinear vertical guidance function, the floating bearing guides (2) of embodiment A1 can be eliminated, resulting in turn in installation space and cost advantages. This embodiment is illustrated schematically in the lower half of FIG. 1 via embodiment A2.

Figure 4:
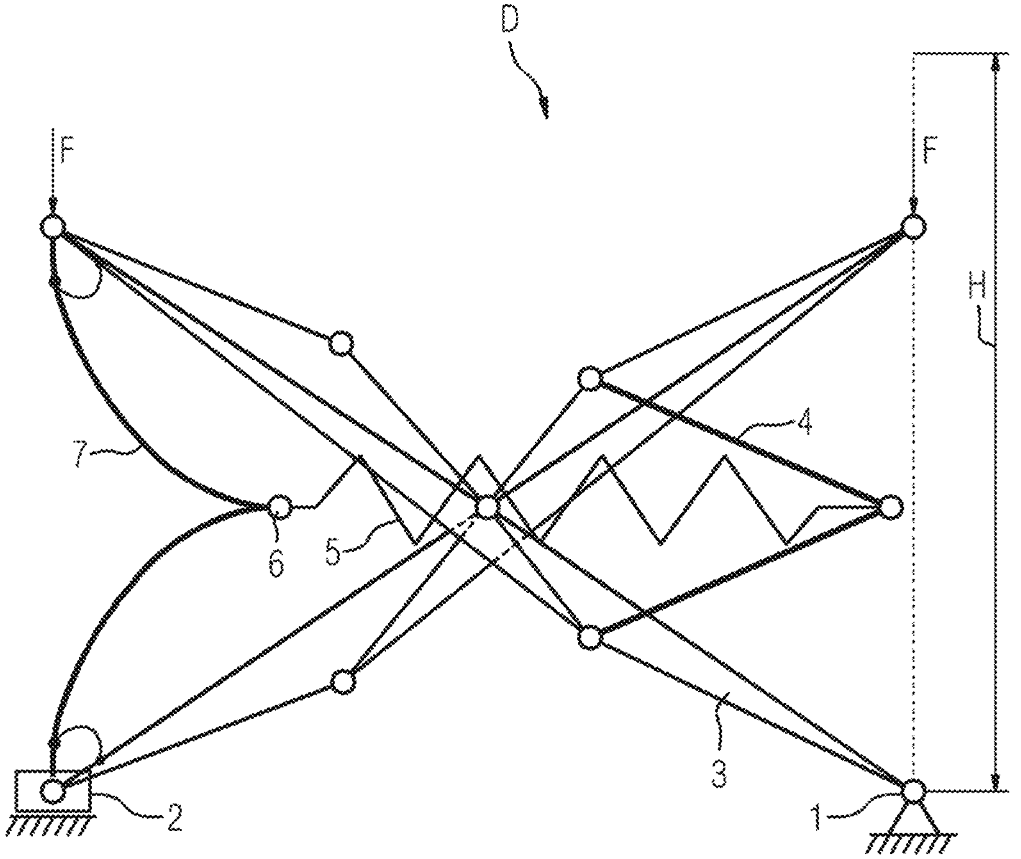
Figure 5:
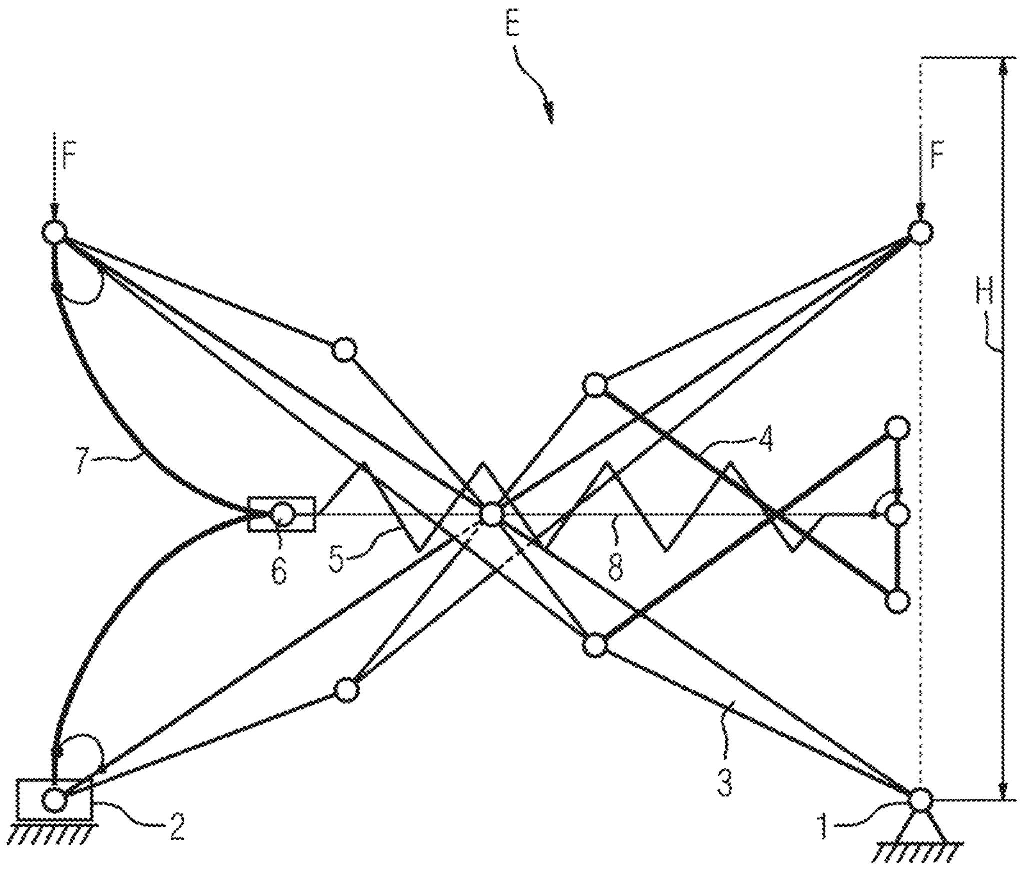

It is likewise possible to attach a lifting cam geometry (7) (lifting cam or cam geometry for short) to the scissor arms (3) on the same side as the fixed or floating bearings instead of the thrust rods in order in this way to achieve spreading of the scissors (3) via a spreading shaft running along the lifting cam; such embodiments D and E are shown in FIGS. 4 and 5. NB: The reference sign (3) is used below both for the scissor mechanism (scissors for short) and for a single scissor arm.

Figure 2:
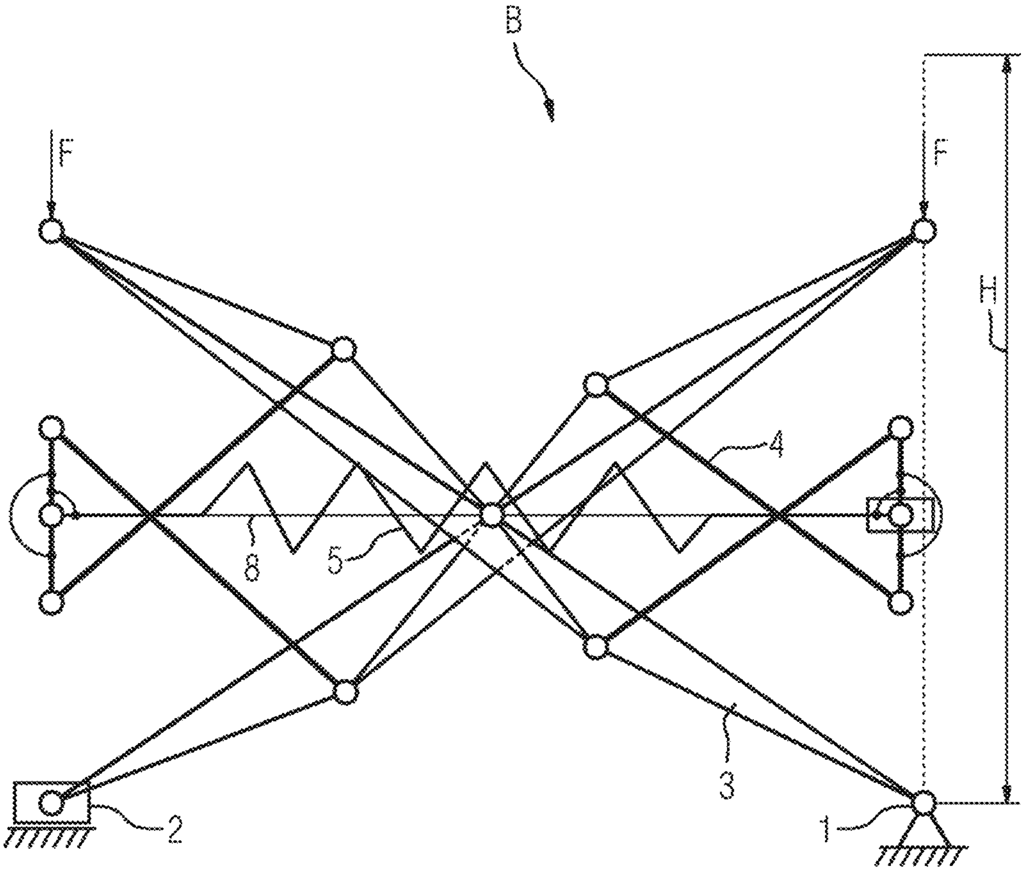
FIGS. 2-5 show a schematic illustration of further embodiments B, C, D, E of the mechanism kinematics of the load-compensating device with alternative spreading devices in accordance with the invention.
Figure 3:
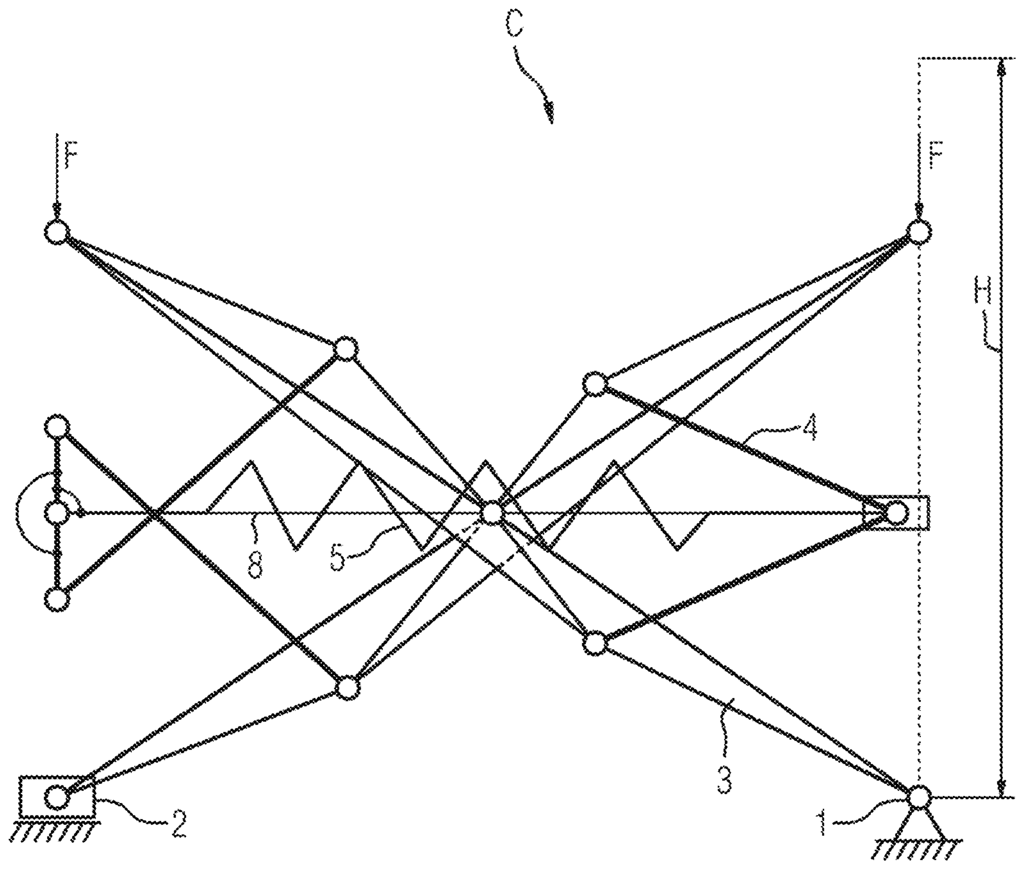

FIGS. 2, 3 and 5 show embodiments B, C and E. These solutions respectively comprise the spreading wedge mechanism (4, 6, 7) in different combinations and are suitable particularly for spring accumulators with shallow characteristics, which have commercially available tension springs or, advantageously, oval wire tension springs, for example. With the adaptation of the lifting cam geometry (embodiments D and E), it is furthermore possible to adjust the force/lifting profile in an optimum manner.

The selected ratios of the scissor-arm and thrust rod lengths in conjunction with the position of the pivoting axes and the spring characteristic and optionally the configuration of the lifting cams make it possible to influence the force/lifting profile of the device. From the schematically illustrated force/lifting profile in FIG. 1, it can be seen that it is possible to achieve a virtually constant lifting force. If the actual force profile is compared with an ideally acting constant force profile, then linearity deviations of less than ±1% are technically achievable. A linearity deviation of ±15% is regarded as an upper limit in respect of the cost-benefit ratio.

As already described with reference to embodiment A2, it is also possible to dispense with the floating bearing guide shown in embodiments B, C, D and E if a rectilinear vertical guidance function is not required based on the application or if the lifting platform already has a vertical guide. This is often the case when existing lifting devices are retrofitted with a load-compensating device.

Technical possibilities for implementation of the embodiment from FIG. 1 and embodiment D from FIG. 4 as well as examples of use thereof are indicated below; embodiments B, C and E show modifications in other combinations of spreading structure.

Figure 6:
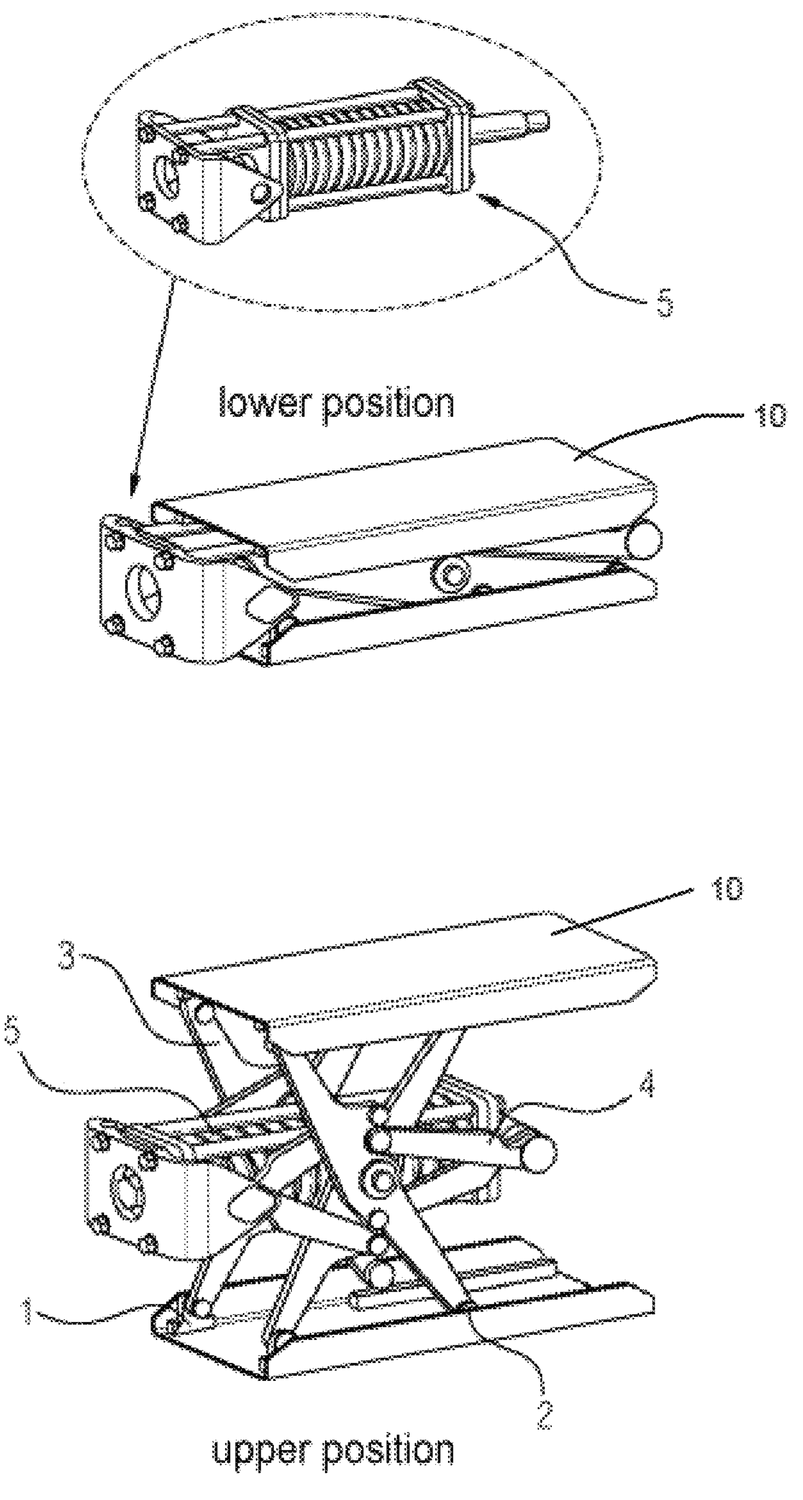
FIG. 6 shows a technical implementation of embodiment A1 with a vertical guidance function in a lowered (lower) position and an extended (upper) position.

FIG. 6 shows a technical implementation of embodiment A1. This explains the interaction between the mechanism elements of the mechanism. The spring accumulator integrated into the lifting mechanism here consists of a spring assembly that is made up of two compression springs mounted one inside the other. These are incorporated mechanically between the thrust rods such that the spring accumulator unit acts like a tension spring. The use of massive compression springs makes it possible to achieve a particularly high power density.

Figure 7:
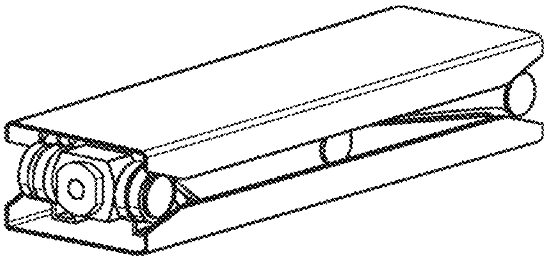
FIG. 7 shows a technical implementation of embodiment D with a vertical guidance function in a lowered (lower) position and an extended (upper) position.
Figure 7:
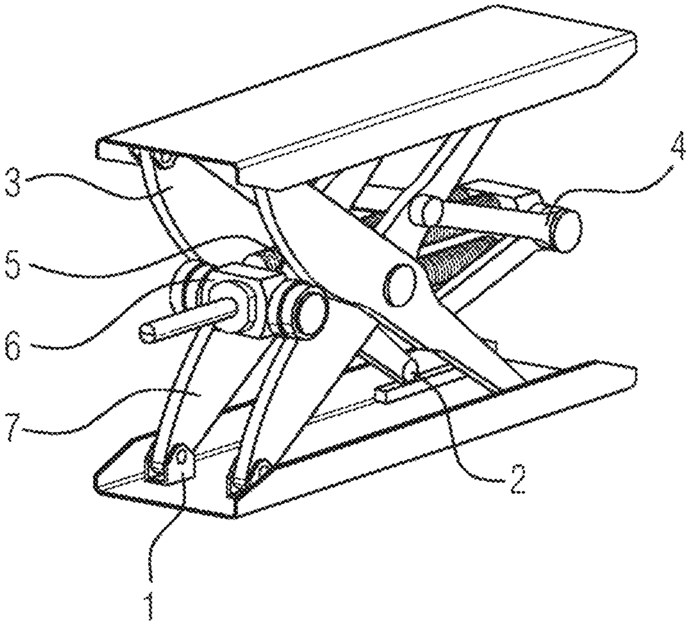

FIG. 7 shows a first technical embodiment of D (FIG. 4) with a rectilinear vertical guidance function of the load-compensating device according to the invention. Here, 4 high-power oval-wire tension springs acting in parallel serve as the spring accumulator, which have a higher power density, higher spring prestresses and lower spring rates than round-wire tension springs. With the number of springs, it is possible to increase or reduce the compensation load; for this purpose, it is also possible to provide coupling structure (not illustrated) to be able to respond to different loads in operation. In the example shown, the lifting cam is part of the scissor-arm contour, where the spreading shaft is guided axially by means of a centrally installed shaft.

Figure 8:
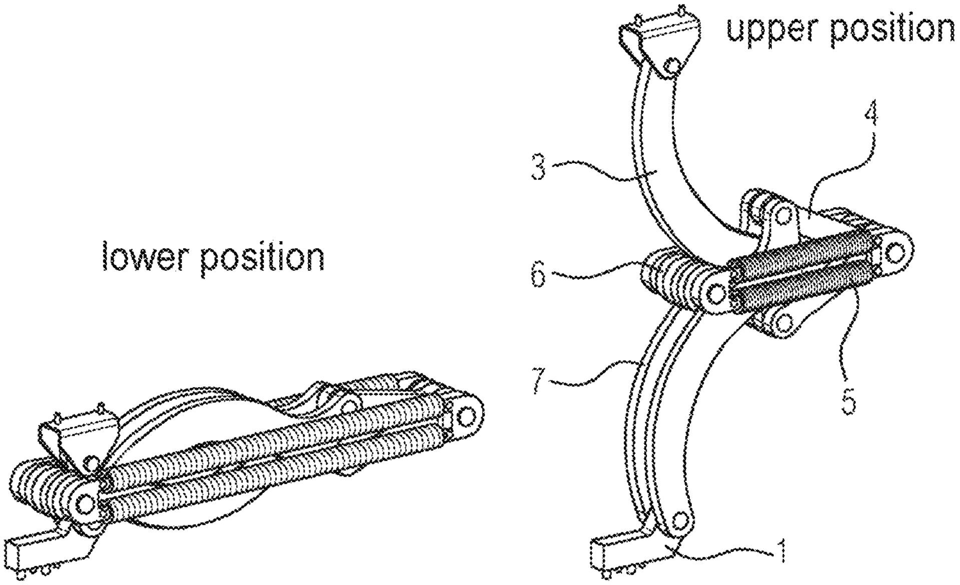
FIG. 8 shows a technical implementation of embodiment D without a vertical guidance function in a lowered (lower) position and an extended (upper) position.

FIG. 8 shows a technical embodiment of D (FIG. 4) without a guidance function, with 4 oval-wire tension springs acting in parallel as an energy accumulator. In this embodiment, the guidance on the floating-bearing side has been dispensed with, thereby eliminating the rectilinear vertical guidance function. Here, guidance of the spreading shaft along the centrally installed lifting cam is advantageously accomplished via a profiled running roller. An increase in the compensation force is achieved via the pairwise addition of spring elements. It is thus also technically possible to operate the embodiment shown in FIG. 8 with, for example, just 2 or with 6 or 8 tension springs acting in parallel. With the high spring prestress incorporated into the oval-wire tension springs, it is possible to generate the desired compensation force without having to additionally prestress the springs. The tension springs are in the form of a block in the upper lifting position. As a result, there is no need here to take any additional measures to disconnect the force or energy of the energy accumulator in the case of maintenance.

Figure 9:
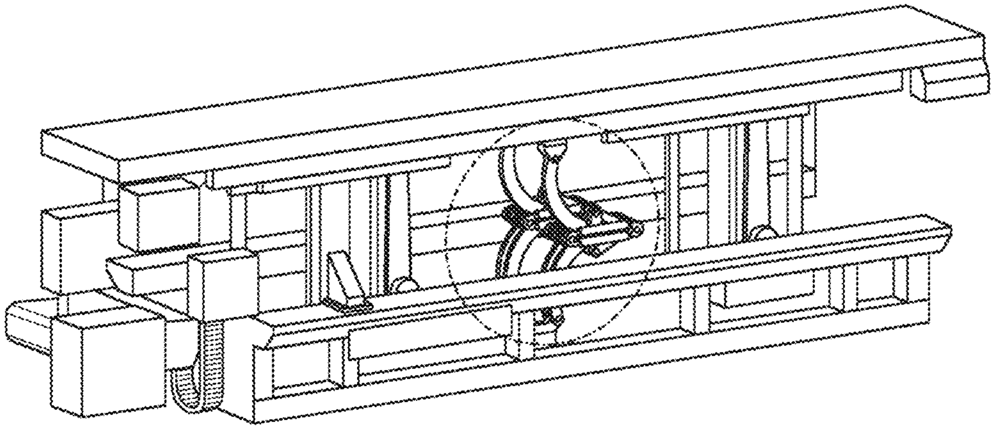
FIG. 9 shows a technical implementation of an integration of embodiment D into an existing lifting and lowering conveying device.

FIG. 9 shows the integration of two load-compensating devices from FIG. 5 acting in parallel into an existing lifting and lowering conveying device. This lifting and lowering conveying device is used to convey a bodyshell in the series manufacture of motor vehicles. In industry, there is often a desire to increase the performance of existing plants. In this example, integration of embodiment D from FIG. 4 in part relieves the load on the lifting mechanism with drivetrain and in part increases the load bearing capacity of the device (in this case by 40%). This retrofitting is associated with relatively little effort, and expensive overall reconstruction of the lifting and lowering conveying device for higher loads is eliminated. As a result, this results in considerable economic advantages.

Another area of use for load-compensating devices are lifting applications that are used on driverless transport vehicles (DTV). Here, the aspect of energy saving and increasing power is particularly prominent because the provision or supply of energy is associated with a high outlay and, in most cases, the lifting power is the limiting factor in this regard.

Figure 10:
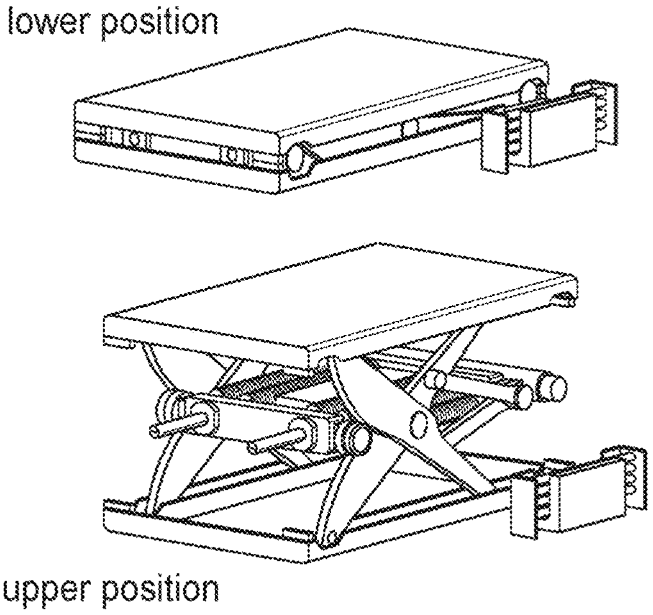
FIG. 10 shows a technical implementation of embodiment D as a lift table with an electric-cylinder/double-motor drive in a lowered (lower) position and an extended (upper) position.

In the case of the load-compensating device shown in FIG. 10 for a DTV, both a vertical guidance function and a driving function have been integrated, resulting in the use as a lift table.

Figure 11:
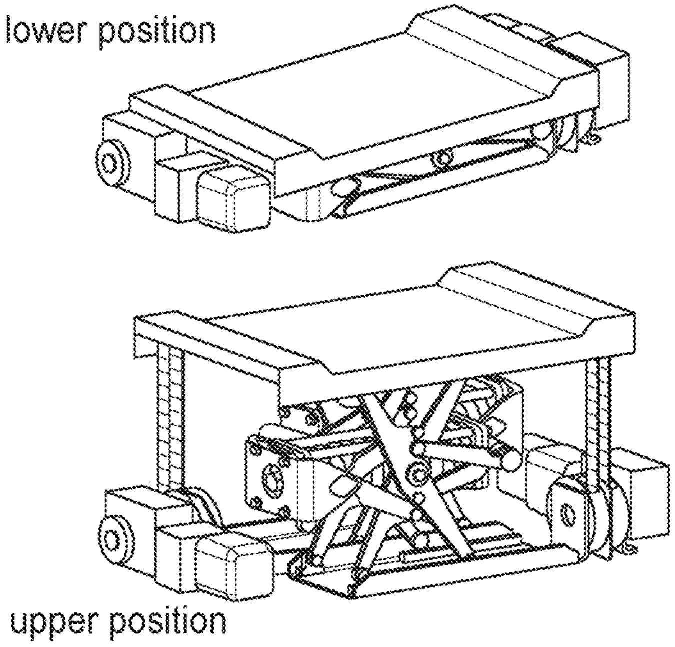
FIG. 11 shows a technical implementation of embodiment A1 as a lift table with a push-chain/double-motor drive in a lowered (lower) position and an extended (upper) position.

The load-compensating device illustrated in FIG. 11 with a guidance and driving function can be used as a lift table for high loads up to 3 t on driverless transport vehicles. Here, the driving function is provided by two push-chain drives synchronized electrically with one another, and the vertical guidance and load-compensating function is provided by two centrally installed load-compensating devices from FIG. 6.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements that perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A load-compensating device for a lifting application with an object to be lifted or lowered, comprising:

a movable platform which carries the object, the platform being supported by at least one spring element to compensate for loads;

wherein the spring element acts on a spreading unit which, in order to achieve spreading, transfers a spring force of the spring element into a scissors arrangement;

wherein, by virtue of the scissors arrangement, the spring force acts as a resultant lifting force, exerting a lifting action on the platform;

wherein a substantially constant lifting force is provided over a substantial lifting distance of the platform by lifting geometry formed via the spreading unit and the scissors arrangement; and wherein the spring element is configured as at least two tension springs acting in parallel, which remain substantially horizontal and parallel to the moveable platform during operation, and is prestressed with a spring prestress at a level such that the spring element is formed as a block in an upper lifting position.

2. The load-compensating device as claimed in claim 1, wherein the spreading unit has thrust rods which are each articulated between the spring element and a scissor arm of the scissors arrangement.

3. The load-compensating device as claimed in claim 1, wherein the spreading unit acts on a cam geometry; and wherein a cam geometry predetermines a profile of a lever action of the spreading unit on the scissors arrangement.

4. The load-compensating device as claimed in claim 2, wherein the spreading unit acts on a cam geometry; and wherein a cam geometry predetermines a profile of a lever action of the spreading unit on the scissors arrangement.

5. The load-compensating device as claimed in claim 3, wherein the cam geometry is formed by at least one curved surface of a scissor arm of the scissors arrangement; and wherein the spring force acts on the curved surface via the spreading unit via a slider or a roller structure.

6. The load-compensating device as claimed in claim 1, wherein the spreading unit is formed as a spreading wedge on at least one side.

* * * * *